Figure 1:
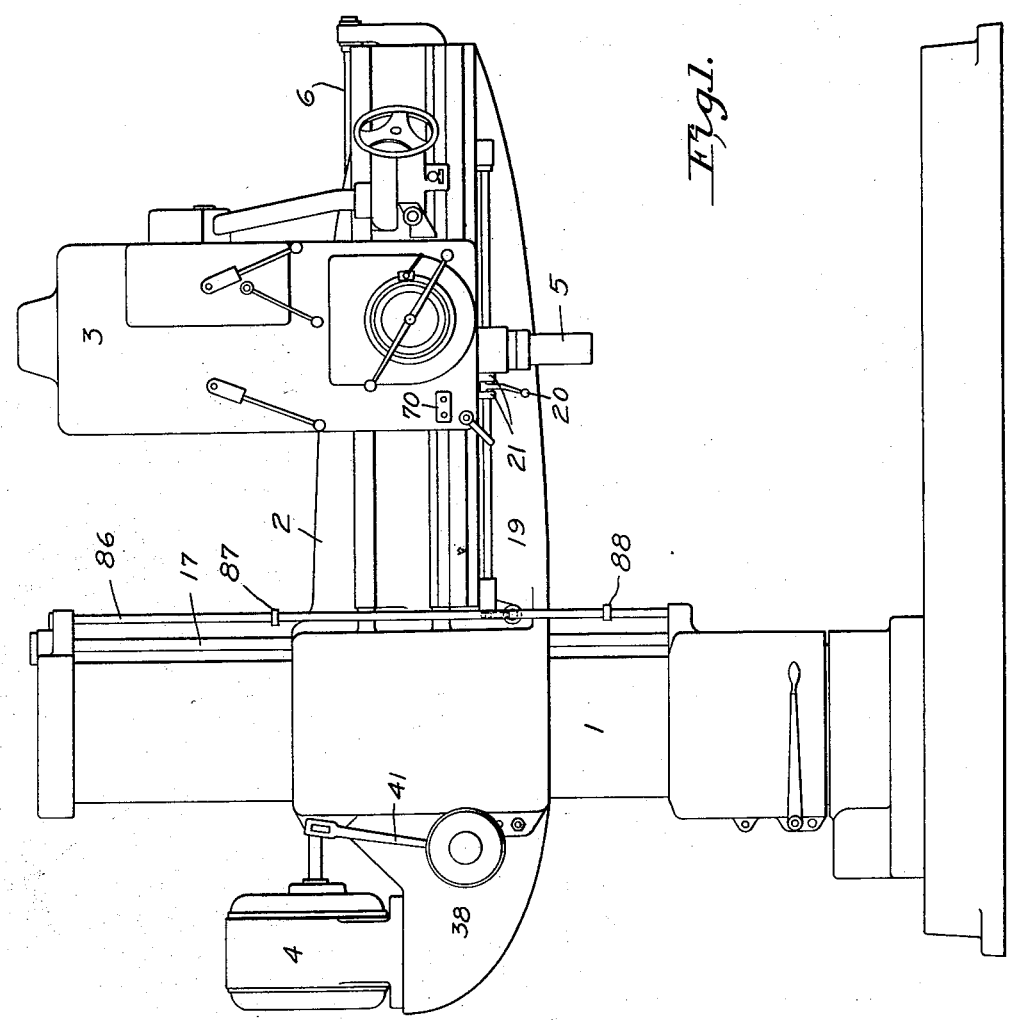

April 24, 1934.  A. M. SOSA  1,956,540

ELECTRIC ARM CLAMPING AND ELEVATING MECHANISM

Filed Jan. 9, 1930  5 Sheets-Sheet 1

Inventor
Augustus M. Sosa
By Attorneys
Nathan & Bowman

April 24, 1934.　　　　A. M. SOSA　　　　1,956,540
ELECTRIC ARM CLAMPING AND ELEVATING MECHANISM
Filed Jan. 9, 1930　　　5 Sheets-Sheet 2

Inventor
Augustus M. Sosa
By Attorneys
Nathan & Bowman

April 24, 1934.     A. M. SOSA     1,956,540
ELECTRIC ARM CLAMPING AND ELEVATING MECHANISM
Filed Jan. 9, 1930     5 Sheets-Sheet 3

Inventor
Augustus M. Sosa
By Attorneys
Nathan & Dowman

April 24, 1934.  A. M. SOSA  1,956,540
ELECTRIC ARM CLAMPING AND ELEVATING MECHANISM
Filed Jan. 9, 1930  5 Sheets-Sheet 4
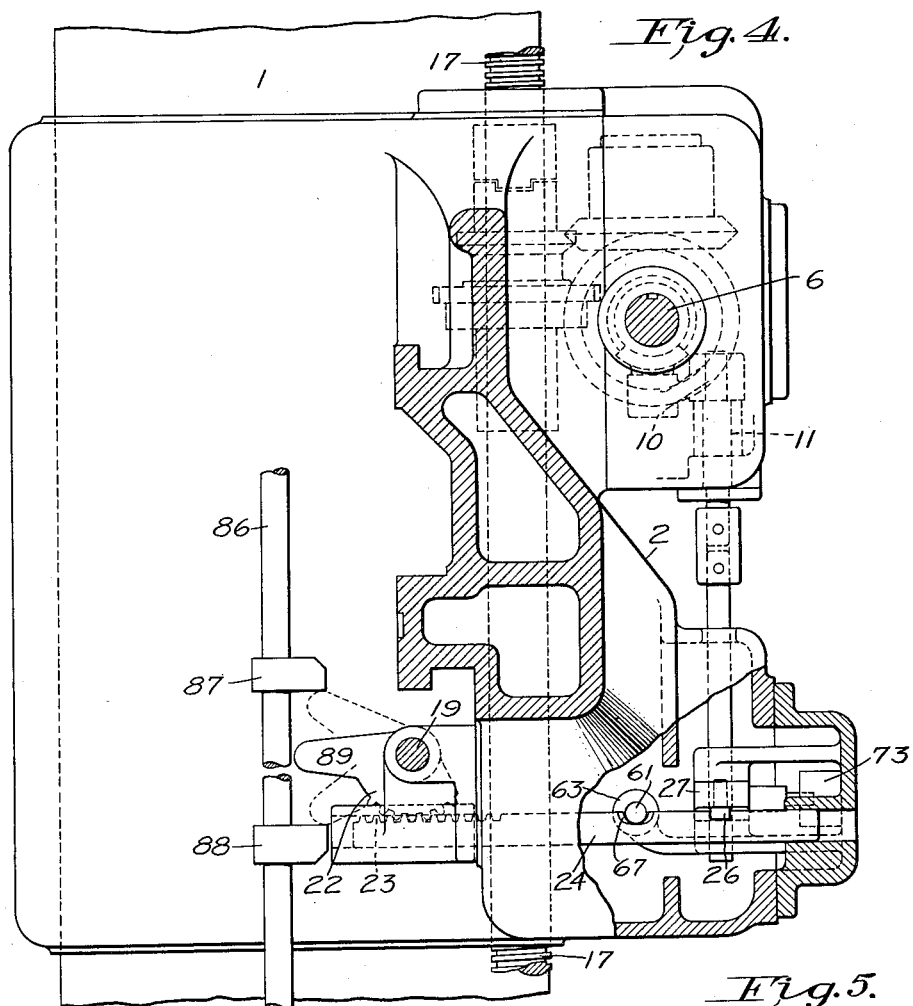
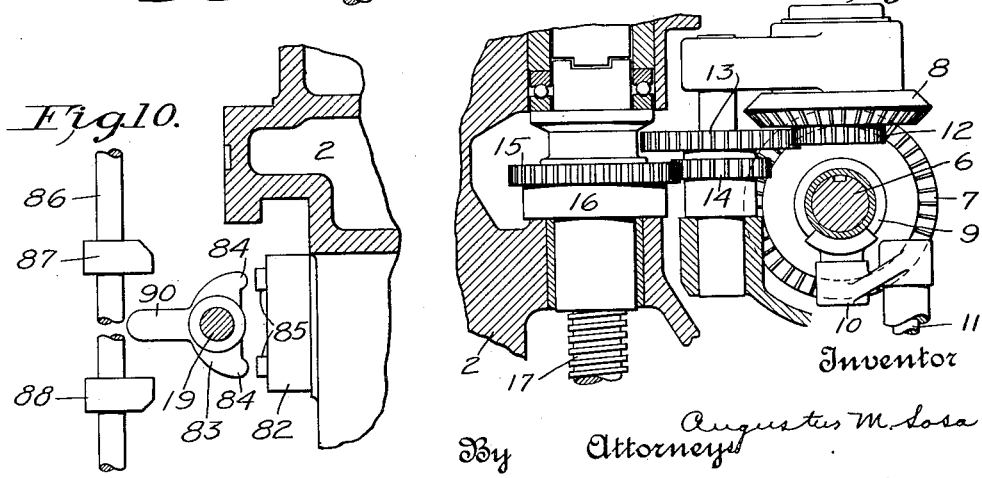

April 24, 1934. A. M. SOSA 1,956,540

ELECTRIC ARM CLAMPING AND ELEVATING MECHANISM

Filed Jan. 9, 1930 5 Sheets-Sheet 5

Inventor
Augustus M. Sosa
By Attorneys
Nathan & Bowman

Patented Apr. 24, 1934

1,956,540

UNITED STATES PATENT OFFICE 1,956,540

ELECTRIC ARM CLAMPING AND ELEVATING MECHANISM

Augustus M. Sosa, Cincinnati, Ohio, assignor to The Cincinnati Bickford Tool Company, Cincinnati, Ohio, a corporation of Ohio Application January 9, 1930, Serial No. 419,563

12 Claims. (Cl. 77—28)

The invention relates to machine tools particularly of the larger heavier type and specifically as disclosed herein a radial drilling machine. Changing conditions, including the demands for increased production, greater accuracy and the discovery and development of stronger cutting tools has resulted in an increase in size and weight of machine tools to the point where it has long been recognized that the heretofore, in part at least, manually operable devices for adjusting and securing the major elements or movable structures, are inadequate and too burdensome on the operator.

The invention contemplates the application of a power means for clamping the horizontally extending arm of a radial drill to the upright supporting column. Power means, such as a rotary electric motor as disclosed herein in connection with the arm clamping means, have been employed in various manners for the clamping of various large machine tool members to their respective supports but heretofore such means have not been applied to the clamping of a radial drill arm to its supporting column and in an endeavor to provide a practical application of such means many new problems have been encountered. Among others it may be noted that owing to the exposed condition of ordinary arm clamping means, a power operating means therefor, in order to be practical, must be closely compacted and in addition suitable for mounting upon and bodily movable with the drill arm. As will later appear from a detail description, certain more or less specific features are coordinated in a manner which provides an organization well adapted to accomplish the desired results.

The more general aspects of the invention are concerned with the provision of an adequate and compact control system capable of easy manual manipulation of the mechanism for elevating the arm and the clamping mechanism. An outstanding feature of this control system is that of the provision of an interlocking or safety device between the clamping and the elevating mechanism which prevents both being concurrently effective. Such interlocking means have been broadly designed and applied to machines of this type but the general organization thereof was far different from that of the present arrangement and the problems encountered offered no solution of those in the present case. In this construction e. g. the safety means must make provision for a power operating means for the arm clamp where heretofore such means had been manually operated. Also, in the present case, the safety device is employed in connection with controls which are mounted on and movable with the drill head as distinguished from the more common type where the hand controls are located directly on the drill arm.

Another outstanding difference between the present organization and many previous devices resides in the fact that the interlock is employed in connection with a system wherein the power elevating means may be caused to operate in either direction, i. e. either to raise or to lower the arm by simply the operation of a single lever; whereas in many former devices the corresponding lever served only to render the elevating means operative and whether the arm was raised or lowered was dependent upon the particular direction in which the main driving means was rotating. In many instances of operation therefore, it was necessary, in addition, to reverse the direction of rotation of the main driving means in order to move the drill arm in the desired direction. Such reversal, however, would usually disturb the operation of some other mechanism such as the drill spindle receiving its motion from the same source and after the drill arm had been adjusted the main driving means was required to be restored to its original direction of rotation.

The present invention includes in the system employed a very simple and compact arrangement which renders it impossible to throw in the power means for elevating the arm while it is clamped to the column and conversely renders it impossible to clamp the arm while it is being elevated. The specific elements which contribute largely to this simple arrangement include, in the preferred form, a slidable member having an operative connection for throwing in the elevating mechanism either to raise or lower the arm, a neutral position also being available; and a switch located in the power line to the clamping motor which is opened by movement of the elevating mechanism to either of its operative positions. Cooperative with the sliding member just mentioned is a second slidable member operative from the rotary clamping shaft near the limits of its forward and reverse rotations such that as the mechanism reaches clamping engagement the interlocking bar engages with and prevents movement of the slidable bar directly connected to the elevating mechanism; and as the arm is unclamped such bar is withdrawn near the end of the unclamped position.

Other objects of the invention involve the advantages emanating from the coordination of certain specific features to result in a simple closely compacted arrangement well adapted to be mounted directly on a bodily movable drill arm, such features including the direct connection of the shaft of the clamping motor to the clamping means, the reduction gearing being mounted on the same shaft and consisting of cooperating externally and internally threaded screws and nuts adapted to directly operate pivoted clamping levers. A feature of particular advantage in the specific type of construction just described resides in the manner in which a cushioning means for the clamping motor is provided. In the preferred form a single spring, in conjunction with an equalizer, is inserted between opposed axially movable nuts and serves to cushion the motor as the nuts closely approach each other.

The invention includes further specific features and in part alternative constructions which may be employed having advantages of particular value in the present organization as will appear later from the detailed description.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
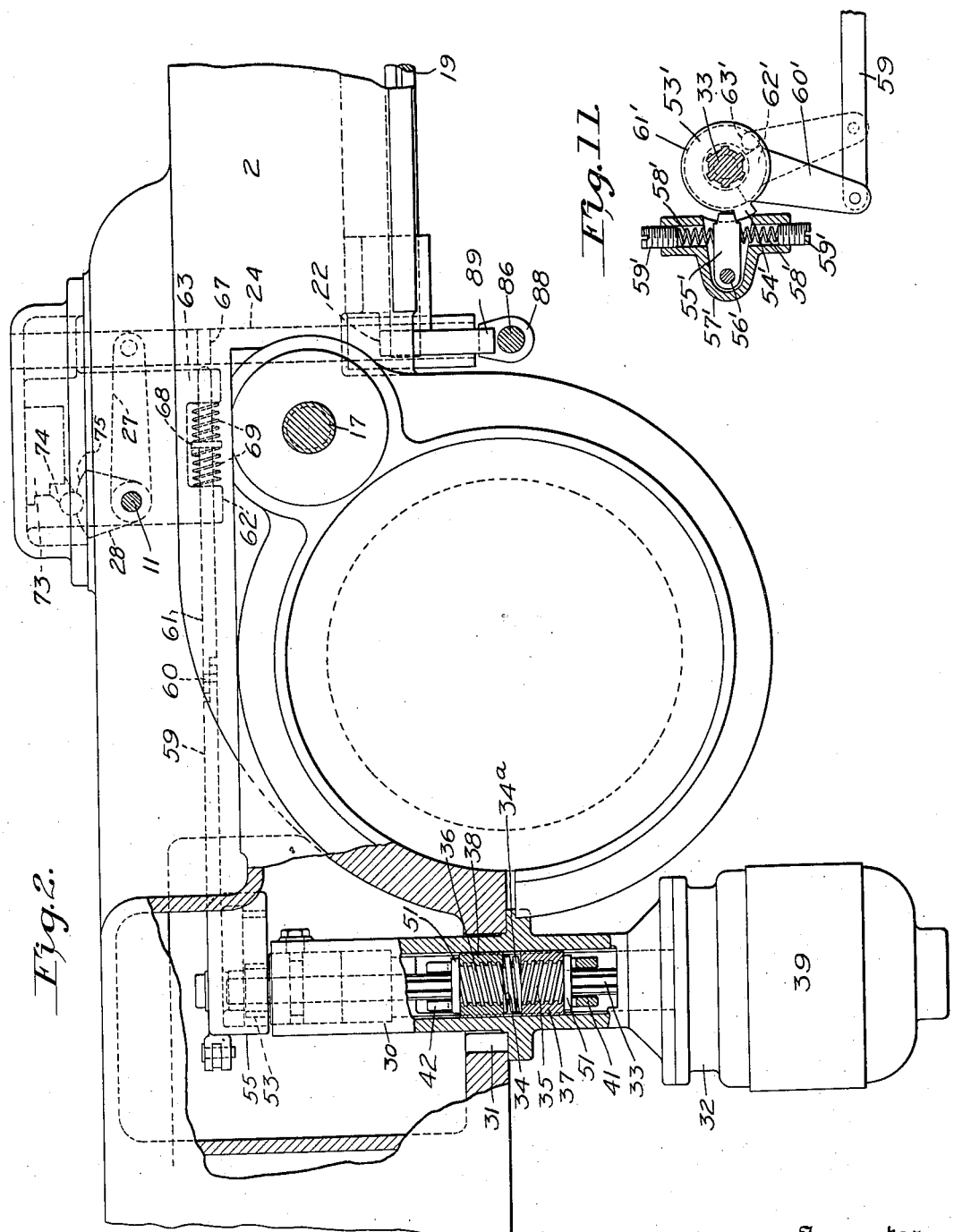
Figure 3:
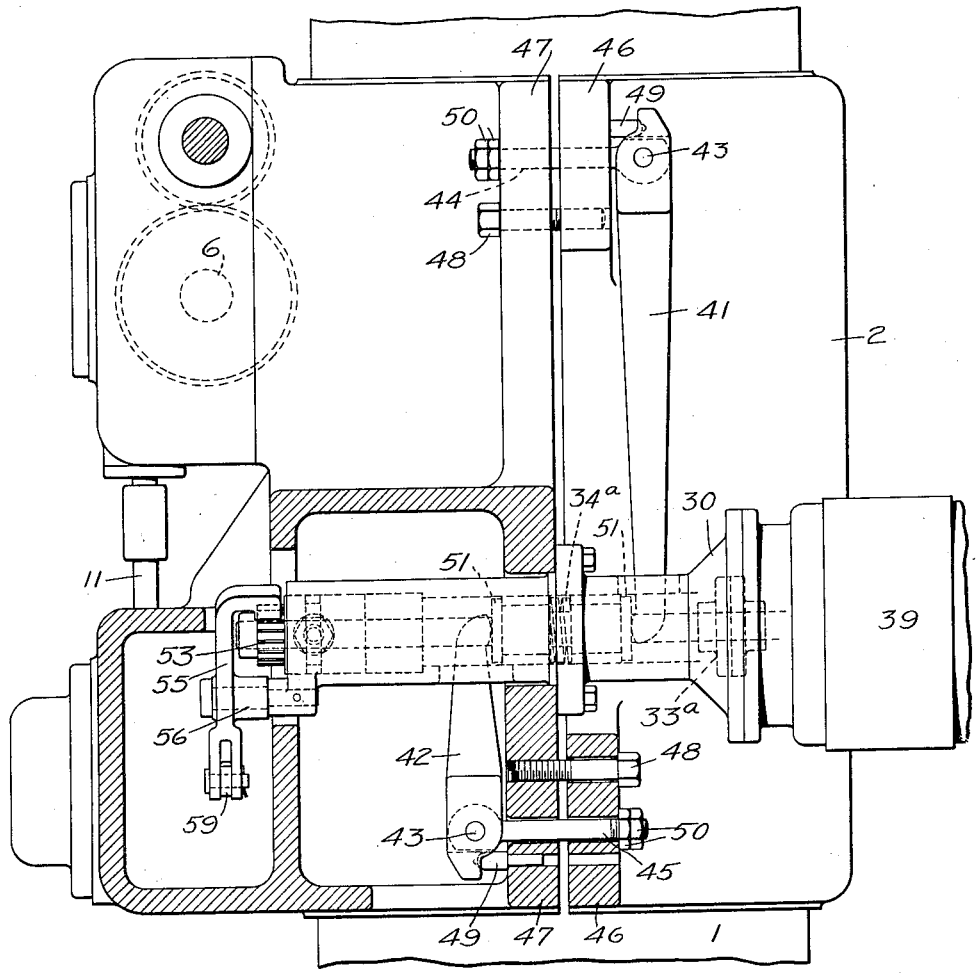
Figure 6:
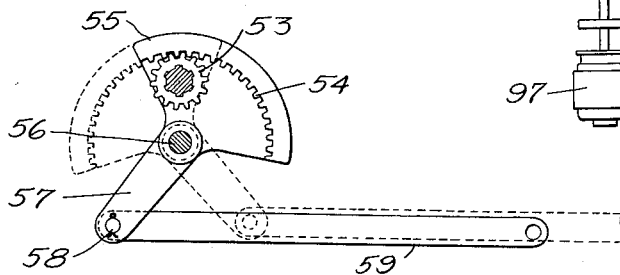
Figure 12:
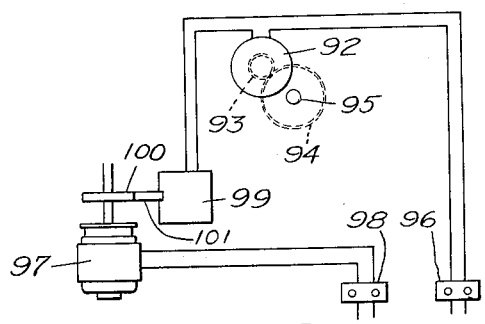
Figure 7:
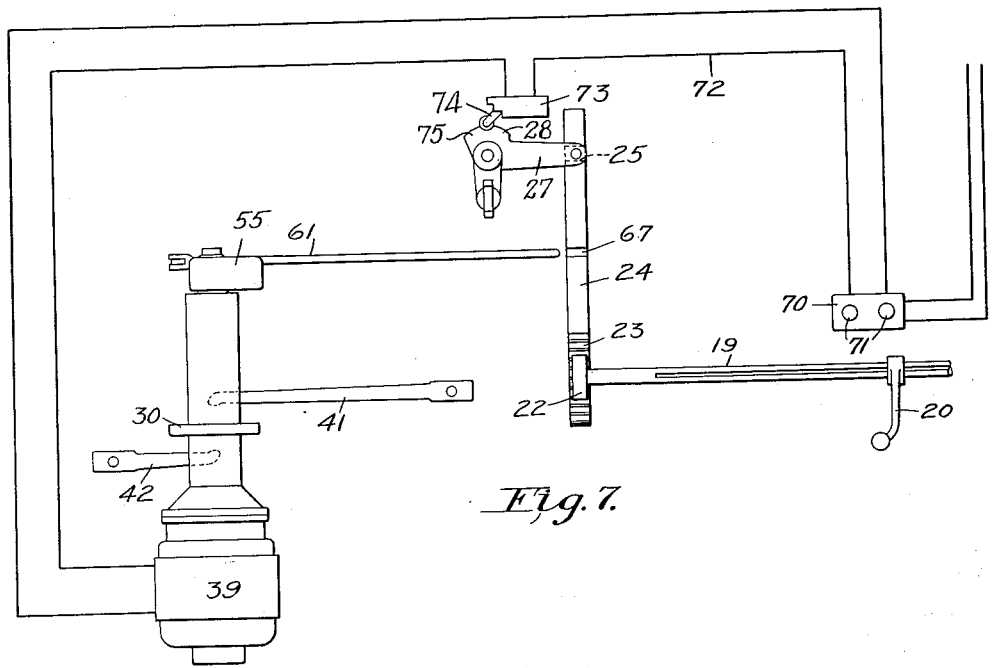
Figure 8:
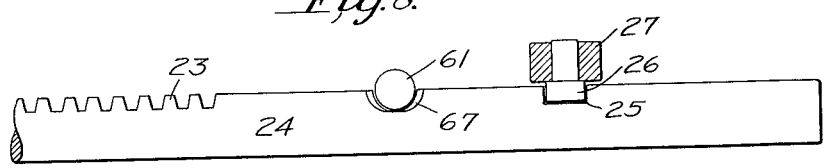
Figure 9:
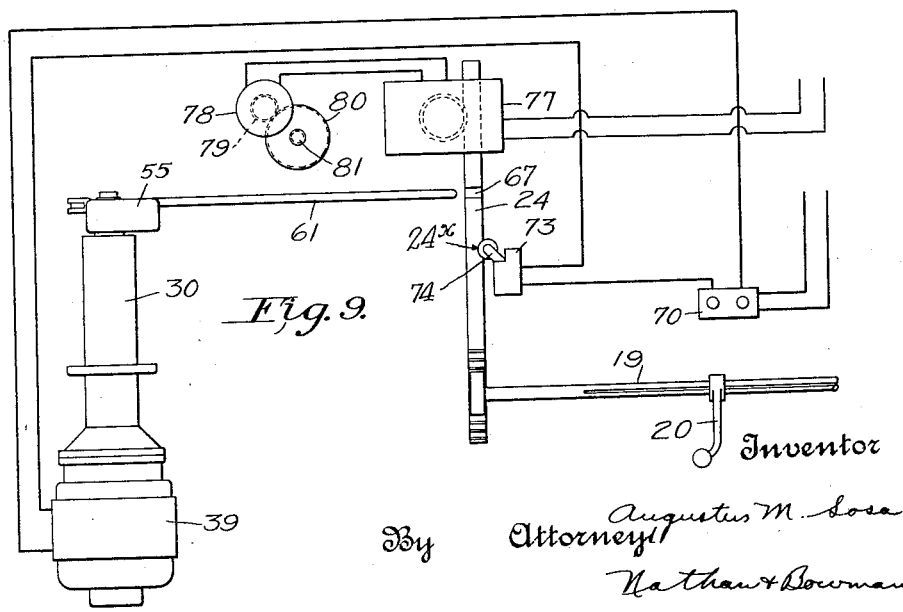

Figure 1 is a general organizational view of a radial drilling machine in which the present invention has been incorporated. Fig. 2 is a partial plan view of the region immediately adjacent the column with a portion of the arm broken away to show certain specific elements of the clamping mechanism. Fig. 3 is a vertical sectional view of the arm taken back of the drill column. Fig. 4 is a like sectional view taken through the arm on the opposite side of the column from Fig. 3. Fig. 5 is a fragmentary view showing the elevating gearing in development. Fig. 6 is a detail view of the connection of the interlock mechanism with the clamping mechanism. Fig. 7 is a diagrammatic view showing the relation of one form of the clamping and elevating mechanism. Fig. 8 is a detail view of the slide bar controlled elevating mechanism. Fig. 9 is a diagrammatic view similar to Fig. 7 but showing an alternative arrangement which may be employed. Fig. 10 shows a further modification in part of the control system. Fig. 11 is a detail view of a different type of interlock connection and cushioning mechanism for the clamping motor; and Fig. 12 is a diagrammatic view of a further modification of the related clamping and elevating means.

In Fig. 1 is shown a more or less conventional radial drill having a main supporting post upon which the sleeve 1 is mounted for rotation, which sleeve carries the large drill arm 2 rotatable with the column sleeve 1 but vertically translatable with respect thereto. Mounted on the arm is the drill saddle or head 3 horizontally movable along the arm in the usual manner. At the opposite end of the arm is the electric motor 4 having suitable shafting and gearing for driving the associated mechanism in the drill head 3 for rotating and feeding the drill spindle 5. In the form shown in Fig. 1 the motor 4 also serves through suitable reversing mechanism to drive the elevating mechanism.

This elevating mechanism shown particularly in Fig. 5 is driven from the main arm shaft 6 and has associated therewith opposed bevel gears of which one indicated at 7 is shown in Fig. 5 meshing with the bevel gear 8, the direction of rotation of the latter gear being determined by the position of the clutch sleeve 9, movable into neutral, forward, and reverse positions through the medium of the clutch arm 10 fixed on the vertical shaft 11 shown best in Figs. 4 and 5. Integral with or secured to the bevel gear 8 is the spur gear 12 meshing with spur gear 13 of a gear set which includes the spur gear 14, the latter meshing with the gear 15 integral with or secured to a rotary nut 16, having internal threads engaging with the vertical shaft 17. This nut 16, being suitably mounted in bearings in the drill arm 2, rotation thereof relative to the vertical screw shaft 17, serves to raise or lower the arm dependent upon the position of the clutch sleeve 9. The elevating mechanism just described constitutes one more or less conventional in type and it will be recognized that other specific types, such as a fixed nut and a rotary screw, may be employed.

The control for the elevating mechanism comprises a shaft 19 rotatably carried upon the drill arm having splined thereon the hand lever 20, which lever is suspended between lugs 21 of the drill head and is movable therewith along the arm. The end of the shaft 19, adjacent the column, carries a gear segment 22, which gear segment meshes with the rack teeth 23 of the slide bar 24. The opposite end of the bar 24 is provided with a cross slot 25 in which engages a pin, and roller, if desired, 26 secured to the arm 27 of an oscillatable member 28, secured to the vertical clutch control shaft 11. Oscillation of the lever 20 therefore serves to operate the clutch sleeve 9 into forward, reverse and neutral positions, as desired.

The clamping mechanism will now be described, such consisting of a casing 30 removably mounted in an opening 31 of the drill arm, the casing 30 having secured thereto the housing 32 of a reversible electric drive motor. Mounted within the casing 30 is a shaft 33 having splined thereon the equalizer 34 which is provided with external screw threads 35 and 36 extending in opposite directions from each other, i. e. being of opposite hand. An internally threaded nut 37 cooperates with threads 35 and in like manner a nut 38 cooperates with threads 36. These nuts 37 and 38 are splined within the casing 30 to prevent rotation thereof resulting, therefore, in translation of the nuts upon rotation of the shaft 33 and sleeve 34. The shaft 33 is directly driven from the motor 39, a coupling 33a being preferably inserted between the motor shaft and the clamp shaft 33 although, if desired, shaft 33 may be a continuation of the motor shaft.

As shown more clearly in Fig. 3 the immediate clamping means consists of opposed levers 41 and 42, pivoted at 43 upon eye-bolts 44 and 45 respectively, extending through the flanged portions 46 and 47 of the split portion of the arm forming a sleeve encompassing the drill column sleeve. Screw bolts 48 are provided to limit the outward opening of the split section. Fulcrums for the levers 41 and 42 consist of pins 49 inserted in openings in the respective flanges 46 and 47. Adjustment of the clamping means may be accomplished through the nuts 50 of the eye-bolts. The inner ends of the levers 41 and 42 bear against plates 51, which in turn are engaged by the nuts 37 and 38. It will be noted that the arrangement described provides, in a most simple and compact manner, the dual function of an equalizer between the clamps and also a compensator for the greater force required to clamp the upper portion of the sleeve as compared with the lower. The weight of the long extended arm carrying the drill head, it will be perceived, creates a turning moment about the drill column resulting in the upper half of the split sleeve at the rear being drawn into engagement with the column and a tendency, therefore, of the split portion to be forced open at that point; whereas at the bottom of the split opening the sleeve would be forced away from the column and capable of being clamped relatively easier than the upper one. By making the upper lever 41 longer than the lower lever 42 a greater force is transmitted to the upper clamp and this condition is compensated for in a simple manner. An equalizing effect results from the fact that the nuts 37 and 38 are both mounted on the sleeve 34 which is freely translatable on the shaft 33.

A resilient bumper or shock absorber is provided to cushion the motor in the unclamping direction against its own momentum or in some cases the additional force resulting from the current being permitted to remain on after the mechanism has been operated to its extreme unclamped position. Such bumper means consists, in the construction shown in Figs. 2 and 3, of a relatively strong coiled compression spring 34a inserted between, and opposing, the approach of nuts 37 and 38 toward each other near the end of the unclamping operation.

The inner end of the arm clamping mechanism is provided with an arrangement designed to function as an interlock between the clamping mechanism and the elevating mechanism, such consisting of a gear 53 secured to the inner end of shaft 33 meshing with an internal gear segment 54 formed on the oscillatory member 55 pivoted at 56 on the casing 30. The lower end of the member 55 has a projecting finger 57 to which is pivoted at 58 an interlock slide bar consisting of the section 59 pivoted in turn at 60 to the section 61. The section 61 slides in openings in the lugs 62 and 63 of the arm and interengages with the bar 24 in a manner to be more specifically described.

Fig. 11 shows a modification of the bumper means and of the interlocking mechanism. In this form the gear 53 is replaced by a cam plate 53' carrying a projecting lug 54' engageable in its path of rotation in either direction with an oscillatable stop member 55' pivoted at 56' in a casing 57' secured in the arm. The stop member 55' has a limited oscillatory motion between opposed springs 58' the tension of which may be adjusted by means of the screws 59'. The interlock mechanism in this form of construction includes an arm 60' to which the link 59 is pivoted, the arm 60' being formed integral with a disk 61' the outer edge of which is shown in dotted lines in Fig. 11. The disk 61' is loosely mounted on the end of shaft 33 for independent rotation with respect thereto but carries an arclike lug 62' adapted to be engaged at either end by a pin 63' carried by the disk 53'.

The arrangement provides a delayed coupling or actuating device whereby the bar 59, during the clamping operation, is forced to the right in Fig. 11 near the end of the rotation of the shaft 33 in that direction and conversely such bar is withdrawn near the end of the reverse or unclamping operation.

The slide bar 24 is provided with a cut-out portion 67 adapted to receive the slide bar 61 in its movement to the right, provided, of course, the slide bar 24 be in a position corresponding to the neutral position of the elevating clutch. The arrangement therefore ensures that the clamp cannot be operated into its effective position except when the elevating mechanism is in neutral position. Also, assuming that the arm has been clamped the slide 61 must, therefore, be in engagement with the opening 67 and in such position will prevent the elevating mechanism being operated to either raising or lowering position. A shock absorbing and limiting device is provided for the rod 61 consisting of a collar 68 secured to the rod 61 and located between the opposed springs 69 which at the opposite ends engage with the respective lugs 62 and 63.

The control of the electric clamping motor is from a main switch 70 conveniently located on and movable with the drill head 3 closely adjacent the lever 20 for controlling the elevating mechanism. The motor is of the reversible type and rotation thereof in one direction is accomplished by pressing one of the buttons of the switch 70 and in the opposite direction by pressing of the other button. Inserted in the line 72, leading to the electric motor is a circuit breaking switch 73, the function of which is to open the circuit when the elevating mechanism is moved to either of its operative positions. The switch 73 may be of any conventional type designed for such general purposes and is diagrammatically illustrated in this application, the essential feature thereof being a switch operating lever 74 engageable with the cam surface 75 of the member 28, the cam 75 being provided with a depression at its central part which, with respect to the lever 74, constitutes the neutral position of the member 28 and in which position the switch is closed. Oscillation of the member 28 in either direction from that shown in Fig. 7 serves to break the circuit and thereby prevent operation of the electric clamping motor at a time when the arm is being either raised or lowered. It may be noted that since the arm 74 of the switch would normally be spring pressed, this device also serves the function of a detent for locating the neutral position of the elevating mechanism.

In Fig. 9 is diagrammatically shown a modification of the operating and control system in which an individual electric motor is provided for the elevating mechanism. In such a case a drum-type switch 77 may be provided operable from the bar 24 through any suitable connection such as a rack and gear mechanism. Oscillation of the drum-type switch serves to cause the motor 78 to rotate in a forward or reverse direction correspondingly and the midpoint being the neutral position at which no current flows to the motor 78. In this form the switch 73 is diagrammatically shown as engaging directly with a notch 24$^x$ in the bar 24 when the switch 77 is in its neutral position, but it may be readily understood that such may be incorporated in the unit 77 and be operated in any suitable manner such as by a cam similar to that shown at 75 in Fig. 7. The elevating motor may be directly geared to a nut such as that shown in Fig. 5 or the converse of the construction shown therein may be employed such as is diagrammatically shown in Fig. 9 in which the motor 78 drives a gear 79 meshing with a gear 80 which is secured to the elevating screw 81, the co-acting nut in this case being secured against rotation in the drill arm.

A further modification is shown in the fragmentary view of Fig. 10. This figure, when taken in connection with the diagrammatic illustration of Fig. 9 portrays a system which may be advantageously used in which the switch 77 is replaced by a push button switch 82 located on the drill arm at some convenient point thereon and operable from the shaft 19 through the medium of the double ended cam 83 having the bearing portions 84 arranged opposite to and adjacent the respective push buttons 85 for forward and reverse rotation.

Means are provided in each of the forms described for automatically throwing out the elevating mechanism at either the extreme upper or lower positions of the arm, such means consisting of a rod 86 secured to a projecting portion of the column sleeve 1 and carrying the adjustable stop members 87 and 88 adapted in the form of Figs. 1 to 7 to engage a projecting finger 89 integral with the gear segment 22 to correspondingly operate the slide bar 24 and the clutch mechanism connected thereto. In the modification of Fig. 10 a similar finger 90 is shown which may, if desirable, and the switch 82 is correspondingly located, be made integral with the cam 83.

A still further modification of the clamping and elevating mechanism is shown diagrammatically in Fig. 12 in which the control of the two mechanisms is accomplished entirely through the medium of directly operated electric switches. In this form the elevating motor is shown at 92 operating through gears 93 and 94 to rotate the elevating screw 95. The motor is controlled by the switch 96 located on the drill head. The clamping motor is indicated at 97 being controlled by the switch 98 also located on the drill head as in previously described forms. A circuit breaking switch 99 is inserted in the power line to the elevating motor, this switch being operated through suitable connections 100 from the shaft of the clamping motor, the arrangement being such that the circuit to the elevating motor is broken except when the clamp shaft has been rotated to substantially extreme unclamped position.

For the purpose above described the cam 100 rotatable with the motor has a depression in the periphery thereof into which the spring pressed latch 101 drops when the motor has rotated to the extreme unclamped position, at which position of the latch the circuit, through the switch 99 in the line to the elevating motor 92, is closed, and upon operation of the switch 96 the arm will be raised or lowered in accordance with which button of switch 96 is depressed. If the arrangement is such that it is desirous that the motor rotate more than one complete turn from the extreme clamped and unclamped positions, then a reduction gearing can be employed between the cam 101 and the motor shaft.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A radial drilling machine combining a supporting column; a drill arm translatably mounted thereon; a tool-head translatable along said arm; power operated means for translating said arm on said column; means for clamping said arm on said column; power means for operating said clamping means; control means carried by said translatable tool-head for each of said power means; and interlocking means for preventing said clamping means and said translating means being made concurrently effective, said interlocking means including first and second transversely and intersectingly arranged slide bars actuated individually by said clamp actuating means and the control means for said arm translating means, the first of said bars being adapted, in one of its positions, to render one of said power means ineffective and to permit the other of said power means to be made effective, said first bar being provided with a notch adapted to be engaged by the second bar when the other of said power means is actuated in one direction thereby to prevent movement of the first bar until said other means is actuated in the opposite direction.

2. Clamping means for securing a relatively movable machine tool member on its support comprising a pair of clamps; a rotary actuating shaft; a power motor for rotating said shaft; a sleeve rotatable therewith but translatable with respect to said shaft, a pair of nuts with threads of opposite hand to each other; screw threads on said sleeve for each of said nuts the latter being arranged thereon in opposed end to end manner; a spring interposed between said nuts and adapted to resist the approach of said nuts toward each other; and means for operating said clamp means by longitudinal movement of said nuts upon rotation of said shaft, said means being arranged to close said clamps by the receding movements of said nuts and to release said clamps by the approaching movement thereof.

3. A machine tool combining a main support; a major member translatably mounted thereon; means for translating said member; control means therefor movable to operative and neutral positions; means for clamping said member to said support; an electric motor for operating said clamping means; means including a circuit breaking switch operated by movement of said control means from neutral position to break the current to said motor to prevent clamping of said member when being translated; and an interlock between said clamping means and the means controlling said translating means to prevent actuation of the latter when the clamp means is effective.

4. A machine tool combining a support; a major member translatably mounted thereon; power operated means for translating said member; a reverser therefor; power operated means for clamping said member to said support; a manually slidable member connected with said reverser and movable to operative and neutral positions for correspondingly controlling said translating means and for rendering said clamping means operable only when the translating means is ineffective; and a slidable interlock member actuated by and movable in accordance with the position of said clamping means and adapted when said major member is clamped to inter-engage with said manually slidable member to prevent movement of the latter to operative position.

5. A machine tool combining a main support; a major member translatably mounted thereon; power means for causing said translation; control means therefor; means for clamping said member on said support; an electric motor for operating said clamping means; a power line therefor; a circuit breaking switch in said line; a manually movable member; connections therefrom for operating said control means; means for operating said switch from said manually movable member the relation being such that the circuit is broken when the control means is in operative position; and means, actuated by said clamp actuating means, to lock said manually shiftable member in an intermediate neutral position when said clamp means is effective.

6. A machine tool combining a main support; a major member translatably mounted thereon; a reversible driving means for translating said member; control means therefor movable to forward, reverse and neutral positions; means for clamping said member to said support; an electric power operating means therefor; a power line connected to said operating means; a switch therein; a manually shiftable member having connections to operate said control means and switch, said connections being so related that the switch is open when said control means is moved to either the forward or reverse operative position; and means actuated by said clamp means to lock said manually shiftable member in an intermediate neutral position when said clamp means is effective.

7. A radial drilling machine combining a column; an arm translatably mounted thereon and provided with a horizontally arranged opening; means for clamping said arm to said column; and operating means for said clamping means comprising a casing secured to said arm and extending into said opening; a rotary shaft mounted in said casing, a rotary motor carried by said casing having its driving shaft directly connected to said rotary shaft, and means including a right and left threaded sleeve splined to said shaft and a pair of nuts engaging said right and left threads and connected with a portion of said clamping means for operating said clamping means from said rotary shaft.

8. A radial drilling machine combining a column; a drill arm translatably mounted thereon and provided with a horizontally disposed opening; means for clamping said arm to said column; a clamp operating lever; a rotary shaft carried by said arm; screw threaded means and a cooperative nut on said shaft for operating said lever by the rotation of said shaft; a rotary motor having its driving shaft directly connected to said first name shaft for rotation thereof; and a casing secured to said arm and projecting into the opening in said arm, said casing affording the sole support for said motor and completely enclosing said rotary shaft, and screw threaded means and said nut.

9. A machine tool combining a supporting standard; a major machine member translatably mounted thereon; clamping means including a pair of pivoted levers for securing said member to said standard; and means for operating said pivoted levers comprising a casing removably secured to said member having a portion projecting thereinto, a reversible rotary motor carried by said casing and having a rotary driving shaft extending therefrom into said casing, said shaft being completely enclosed, and screw threaded sleeve splined to said shaft and cooperative nuts on said sleeve, said pivoted levers extending through an opening in said casing into engagement with said nut for operation thereby, said splined sleeve and cooperating nuts affording means for equalizing the clamping action effected by said levers.

10. In a radial drill having a column, an arm translatably mounted on the column; means for translating the arm on the column and means to clamp the arm to the column; a first electric motor connected to actuate said arm clamp means; a second electric motor connected to actuate said arm translating means; a first electric circuit connected to the first motor and including a manually actuated controlling switch and a circuit breaking switch; a second electric circuit connected to said arm translating motor and including a controlling and reversing switch; manual means including a slide rod for actuating the last named switch; an operative connection between said slide rod and said circuit breaking switch to permit said first circuit to be closed only when said second circuit is open; and a mechanical interlock between said clamp actuating means and the control for said arm translating motor to prevent actuation of said arm translating motor when the arm clamp is closed.

11. In a radial drill having a column, an arm translatably mounted on the column, means for translating the arm on the column, and means to clamp the arm to the column; a first electric motor connected to actuate said arm clamp means; a second electric motor connected to actuate said arm translating means; a first electric circuit connected to the first motor and including a manually actuated controlling switch; a second electric circuit connected with the second motor and including a controlling and reversing switch; manual means for actuating the last named switch; a circuit breaking switch embodied in said first circuit and adapted to be actuated by said manual means to maintain said circuit open and the clamp motor ineffective whenever the arm translating motor is effective; and a mechanical interlock between said arm clamping means and said manual means to prevent actuation of said translating means when the clamping means is effective.

12. In a radial drill having a column, an arm translatably mounted thereon, power actuated means for translating said arm and means for clamping the arm to the column; an electric motor connected to actuate said arm clamp; an electric circuit connected with said motor and including a controlling switch and a circuit breaking switch; a controller for said power actuated arm translating means including a slide bar and manual means to actuate the slide bar selectively to cause elevation or depression of the arm or to render said translating means ineffective; an interlock between said arm clamping means and said bar to prevent actuation of said arm translating means except when the arm clamp is released; and means actuated by said slide bar to open said circuit breaking switch thereby to prevent actuation of said clamp motor except when the arm translating means is ineffective.

AUGUSTUS M. SOSA.